(12) United States Patent
Hayashi et al.

(10) Patent No.: US 9,624,952 B2
(45) Date of Patent: Apr. 18, 2017

(54) INSERTION FRAME STRUCTURE AND HOUSING USING SAME

(75) Inventors: Tomoyuki Hayashi, Tokyo (JP); Kenichi Hashizume, Tokyo (JP); Masatoshi Urakawa, Tokyo (JP); Taichi Uto, Tokyo (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 596 days.

(21) Appl. No.: 14/116,558

(22) PCT Filed: Jun. 11, 2012

(86) PCT No.: PCT/JP2012/064902
§ 371 (c)(1),
(2), (4) Date: Nov. 8, 2013

(87) PCT Pub. No.: WO2012/173087
PCT Pub. Date: Dec. 20, 2012

(65) Prior Publication Data
US 2014/0105674 A1    Apr. 17, 2014

(30) Foreign Application Priority Data

Jun. 13, 2011    (JP) .................................. 2011-130820

(51) Int. Cl.
*F16B 7/20*    (2006.01)
*E04B 1/58*    (2006.01)
(Continued)

(52) U.S. Cl.
CPC .............. *F16B 7/20* (2013.01); *E04B 1/5806* (2013.01); *E04B 1/5818* (2013.01); *E04B 2/765* (2013.01);
(Continued)

(58) Field of Classification Search
CPC .. F16B 17/20; F16B 5/10; E04B 9/127; E04B 2/766; E04B 2/765; Y10T 403/7001;
(Continued)

(56) References Cited

U.S. PATENT DOCUMENTS 1,214,928 A * 2/1917 Lachman ................ E04C 2/423
52/656.6
3,287,874 A * 11/1966 Stahlhut .................. E04B 9/125
52/506.08

(Continued)

FOREIGN PATENT DOCUMENTS

CN    101080537 A    11/2007
JP    S58-106805 U    7/1983
(Continued)

OTHER PUBLICATIONS

Office Action (Notice of Reasons for Rejection) issued Feb. 12, 2014, by the Japanese Patent Office in corresponding Japanese Patent Application No. 2013-520545, and an English Translation of the Office Action. (6 pages).

(Continued)

*Primary Examiner* — Joshua J Michener
*Assistant Examiner* — Alp Akbasli
(74) *Attorney, Agent, or Firm* — Buchanan Ingersoll & Rooney PC

(57) ABSTRACT

To enhance the positioning accuracy between primary members and auxiliary members without need of latch parts such as rivets, an insertion frame structure includes: a pair of primary members having L-shaped cross-sections and placed with the L shapes facing to each other symmetrically; and several auxiliary members having angular U-shaped cross-sections between the primary members. The primary members and the auxiliary members are joined at latch portions. The latch portions of the primary members have (Continued)

clearance-shaped latch holes. The latch portions of the auxiliary members have convex portions to be inserted into the latch holes. Each latch hole has a clearance with a larger dimension than a plate thickness t of the auxiliary members, and continuously from the clearance, a clearance with a dimension smaller than the plate thickness t of the auxiliary members.

14 Claims, 12 Drawing Sheets

(51) Int. Cl.
    *F16B 5/10* (2006.01)
    *E04B 2/76* (2006.01)
    *E04B 9/12* (2006.01)
    *F16B 7/04* (2006.01)
    *F16B 21/09* (2006.01)

(52) U.S. Cl.
    CPC .............. *E04B 2/766* (2013.01); *E04B 9/127* (2013.01); *F16B 5/10* (2013.01); *F16B 7/0446* (2013.01); *F16B 21/09* (2013.01); *Y10T 403/46* (2015.01)

(58) Field of Classification Search
    CPC ......... Y10T 403/7003; Y10T 403/7043; Y10T 403/7073; Y10T 403/7096
    USPC .............. 52/506.01, 506.03, 506.05, 506.06, 52/506.08, 506.09, 510
    See application file for complete search history.

(56) References Cited

U.S. PATENT DOCUMENTS

| | | | | |
|---|---|---|---|---|
| 3,356,402 A * | 12/1967 | Smith | ............. | E04B 9/122 403/219 |
| 3,367,695 A * | 2/1968 | Haertel | ............. | E04B 9/122 403/219 |
| 3,369,332 A * | 2/1968 | Harlan | ............. | E04B 9/068 52/144 |
| 3,457,688 A * | 7/1969 | Znamirowski | .......... | E04B 9/068 403/219 |
| 3,921,363 A * | 11/1975 | Beynon | ............. | E04B 9/122 403/219 |
| 3,979,874 A * | 9/1976 | Cubbler, Jr. | ............. | E04B 9/122 52/506.07 |
| 3,996,716 A * | 12/1976 | Tuten | ............. | E04B 9/14 52/506.06 |
| 4,034,534 A * | 7/1977 | Taylor | ............. | E04B 9/345 403/347 |
| 4,208,851 A * | 6/1980 | Sauer | ............. | E04B 9/067 403/188 |
| 4,264,231 A * | 4/1981 | Rosenbaum | ............. | E04B 9/122 403/347 |
| 4,389,828 A * | 6/1983 | Cary | ............. | E04B 9/064 52/506.06 |
| 4,492,066 A * | 1/1985 | LaLonde | ............. | E04B 9/127 52/506.06 |
| 4,494,350 A * | 1/1985 | Sharp | ............. | E04B 9/122 403/347 |
| 4,598,521 A * | 7/1986 | Slapsys | ............. | E04B 9/127 403/187 |
| 4,658,562 A * | 4/1987 | Brugman | ............. | E04B 9/345 52/665 |
| 4,757,663 A * | 7/1988 | Kuhr | ............. | E04B 2/7409 52/481.1 |
| 4,844,565 A * | 7/1989 | Brafford | ............. | A47B 87/008 292/36 |
| 4,866,900 A * | 9/1989 | Dunn | ............. | E04B 9/067 403/363 |
| 5,137,390 A * | 8/1992 | Felsen | ............. | E04B 9/10 403/347 |
| 5,154,031 A * | 10/1992 | Wall | ............. | E04B 9/10 403/346 |
| 5,363,622 A * | 11/1994 | Sauer | ............. | E04B 9/008 403/363 |
| 5,966,887 A * | 10/1999 | Mieyal | ............. | E04B 9/122 52/506.07 |
| 6,446,406 B1 * | 9/2002 | Sauer | ............. | E04B 9/064 52/506.06 |
| 6,851,238 B2 * | 2/2005 | Rebman | ............. | E04B 9/127 52/22 |
| 7,392,629 B1 * | 7/2008 | Bankston | ............. | E04B 9/006 52/506.07 |
| 7,490,446 B1 * | 2/2009 | Chuang | ............. | E04B 9/122 52/232 |
| 7,634,881 B2 * | 12/2009 | Ahren | ............. | E04B 9/241 52/506.06 |
| 7,730,690 B2 * | 6/2010 | Miller | ............. | E04B 9/18 248/333 |
| 8,341,900 B2 * | 1/2013 | Reyal | ............. | F24J 2/4614 52/173.3 |
| 8,359,803 B2 * | 1/2013 | Lehane, Jr. | ............. | E04B 9/068 52/506.08 |
| 8,511,028 B2 * | 8/2013 | Lehane, Jr. | ............. | E04B 9/122 52/506.07 |
| 8,955,272 B1 * | 2/2015 | Underkofler | ............. | E04B 9/242 52/220.6 |
| 8,955,273 B1 * | 2/2015 | Lehane, Jr. | ............. | E04B 9/122 52/220.6 |
| 9,109,361 B2 * | 8/2015 | Daudet | ............. | E04C 3/07 |
| 2003/0097809 A1 * | 5/2003 | Li | ............. | E04B 9/068 52/506.07 |
| 2003/0200719 A1 * | 10/2003 | Koski | ............. | E04B 9/068 52/843 |
| 2007/0022690 A1 * | 2/2007 | LaLonde | ............. | E04B 9/30 52/506.07 |
| 2007/0130869 A1 * | 6/2007 | Platt | ............. | E04B 9/067 52/506.08 |
| 2007/0283656 A1 * | 12/2007 | Anderson | ............. | E04B 9/303 52/506.06 |
| 2008/0229680 A1 * | 9/2008 | Jahn | ............. | E04B 9/067 52/105 |
| 2009/0205275 A1 | 8/2009 | Isaac | | |
| 2010/0043330 A1 * | 2/2010 | Svensson | ............. | E04B 9/18 52/506.08 |
| 2011/0283634 A1 * | 11/2011 | Underkofler | ............. | E04B 9/067 52/167.1 |

FOREIGN PATENT DOCUMENTS

| | | |
|---|---|---|
| JP | 2003-284633 A | 10/2003 |
| JP | 3135790 U | 9/2007 |
| JP | 2008-66513 A | 3/2008 |
| JP | 3142241 U | 6/2008 |
| JP | 2010-84929 A | 4/2010 |

OTHER PUBLICATIONS

International Search Report (PCT/ISA/210) mailed on Sep. 18, 2012, by the Japanese Patent Office as the International Searching Authority for International Application No. PCT/JP2012/064902.
European Search Report dated Feb. 12, 2015 issued in corresponding European Patent Appln. No. 12801130.1 (5 pages).
European Search Report dated Feb. 12, 2015 issued in corresponding European Patent Appln. No. 14197309.9 (5 pages).
Chinese Office Action dated Jan. 6, 2015 issued in corresponding Chinese Patent Appln. No. 201280028985.8, with English translation (13 pages).
Office Action (Second Notice of Reason for Rejection) issued on Sep. 29, 2015, by the Chinese Patent Office in corresponding Chinese Patent Application No. 201280028985.8, and the partial English Translation of the Office Action. (13 pages).
Office Action (Third Notice of Reasons for Rejection) issued by the Chinese Patent Office on Apr. 12, 2016 in corresponding Chinese

(56) References Cited

OTHER PUBLICATIONS

Patent Application No. 201280028985.8, and a partial English Translation of the Office Action. (14 pages).

* cited by examiner (a)

(b)

(a)

(b)

(a)

(b)

(c)

(a)

(b)

(a)

(b)

INSERTION FRAME STRUCTURE AND HOUSING USING SAME

TECHNICAL FIELD

The present invention relates to an insertion frame structure assembled by fitting members into each other, and to a housing the insertion frame structure.

BACKGROUND ART

In the case where a shape steel with an H-shape or a groove shape or sheet metal is bent into an L shape or an angular U shape, and then such bent members are assembled to manufacture a frame structure, generally, these members are joined by welding. Upon this welding, in order to accurately adjust the positions of the members and improve the work efficiency of the welding, a special fixture and an exclusive welding technician are needed. In addition, in the case of performing such welding, since thermal distortion due to welding occurs, repair work such as distortion removal is needed. Thus, a problem of causing much labor and cost arises.

In order to solve this problem, an insertion frame structure is proposed which is composed of a pair of primary members with an angular U shape and a plurality of auxiliary members joined with the primary members by inserting both end portions of the auxiliary members to the primary members. In this insertion frame structure, latch holes with a rectangular shape are formed on the primary members, convex portions to be engaged with the rectangular-shaped latch holes are provided at the end portions of the auxiliary members, the convex portions are engaged with the rectangular-shaped latch holes, and these members are swaged with a latch member such as a rivet, thereby joining these members (for example, see Patent Document 1).

CITATION LIST

Patent Document

Patent Document 1: Japanese Utility Model Registration No. 3142241 (Pages 3 to 5 and FIGS. 1 to 6)

SUMMARY OF THE INVENTION

Problems to be Solved by the Invention

However, in the insertion frame structure in Patent Document 1, where the plate thickness of the auxiliary member having the convex shape is t, an insertion margin is provided such that the clearance of the latch hole with a rectangular shape is slightly larger than the dimension of the plate thickness t. Therefore, a problem that the positioning accuracy between the members is deteriorated by an amount corresponding to the difference between the dimension of the plate thickness t and the dimension of the clearance of the latch hole.

In addition, since the dimension of the clearance of the latch hole is larger than the dimension of the plate thickness t of the member, the members are easily detached from each other when load is applied. Therefore, a latch member such as a rivet is needed in order to prevent such easy detachment. That is, the number of parts increases by the number of latch members such as a rivet, thereby causing a problem of increasing the work processes such as swaging.

The present invention has been made in view of the above problems, and an object of the present invention is to provide an insertion frame structure that enhances the positioning accuracy between a primary member and an auxiliary member and does not need a latch member such as a rivet.

Solution to the Problems

An insertion frame structure according to the present invention includes: a pair of primary members whose cross-sectional shapes are, at least partially, L shapes, and which are placed being separated by a predetermined distance such that the inner surface sides of the L shapes face to each other symmetrically with respect to a center line passing the midpoint of the predetermined distance; and a plurality of auxiliary members whose cross-sectional shapes are, at least partially, L shapes, and which are placed between the primary members. The primary members and the auxiliary members are joined with each other at their latch portions. The latch portions of the primary members each have a latch hole with a clearance shape. The latch portions of the auxiliary members each have a convex portion to be inserted into the latch hole. Each of the latch holes has a clearance with a larger dimension than a plate thickness t of the auxiliary member, and has, continuously from the clearance, a clearance with a dimension equal to the plate thickness t of the auxiliary member or smaller than the plate thickness t of the auxiliary member.

Another insertion frame structure according to the present invention includes: a pair of groove-shaped primary members whose cross-sectional shapes are, at least partially, angular U shapes, and which are placed being separated by a predetermined distance and facing to each other symmetrically with respect to a center line passing the midpoint of the predetermined distance; and a plurality of auxiliary members whose cross-sectional shapes are, at least partially, L shapes, and which are placed between the primary members. The primary members and the auxiliary members are joined with each other at their latch portions. The primary members are placed with a bottom portion of the groove shape facing downward. At a latch portion of each of the primary members, the height of one of walls which is closer to the center line side is lower than the height of the other wall on the outer side. At the latch portion of each of the primary members, latch holes with a clearance shape are formed on the one wall, the bottom portion, and the other wall. The latch portion of each of the auxiliary member has: a first convex portion to be inserted into the latch hole formed on the other wall; a second convex portion to be inserted into the latch hole formed on the bottom portion; and a third convex portion to be inserted into the latch hole formed on the one wall. Each of the latch holes has a clearance with a larger dimension than a plate thickness t of the auxiliary member, and has, continuously from the clearance, a clearance with a dimension equal to the plate thickness t of the auxiliary member or smaller than the plate thickness t of the auxiliary member.

A housing according to the present invention is a sheet metal housing formed by sheet metal, in which the insertion frame structure according to the present invention is fixed on the inner side surface of the housing.

Effect of the Invention

The insertion frame structure according to the present invention includes: a pair of primary members whose cross-sectional shapes are, at least partially, L shapes, and which are placed being separated by a predetermined distance such that the inner surface sides of the L shapes face to each other symmetrically with respect to a center line passing the midpoint of the predetermined distance; and a plurality of auxiliary members whose cross-sectional shapes are, at least partially, L shapes, and which are placed between the primary members. The primary members and the auxiliary members are joined with each other at their latch portions. The latch portions of the primary members each have a latch hole with a clearance shape. The latch portions of the auxiliary members each have a convex portion to be inserted into the latch hole. Each of the latch holes has a clearance with a larger dimension than a plate thickness t of the auxiliary member, and has, continuously from the clearance, a clearance with a dimension equal to the plate thickness t of the auxiliary member or smaller than the plate thickness t of the auxiliary member. Therefore, the positioning accuracy between the primary member and the auxiliary member is enhanced, and in addition, since the primary member and the auxiliary member are not easily detached, a latch member such as a rivet is not needed.

The other insertion frame structure according to the present invention includes: a pair of groove-shaped primary members whose cross-sectional shapes are, at least partially, angular U shapes, and which are placed being separated by a predetermined distance and facing to each other symmetrically with respect to a center line passing the midpoint of the predetermined distance; and a plurality of auxiliary members whose cross-sectional shapes are, at least partially, L shapes, and which are placed between the primary members. The primary members and the auxiliary members are joined with each other at their latch portions. The primary members are placed with a bottom portion of the groove shape facing downward. At a latch portion of each of the primary members, the height of one of walls which is closer to the center line side is lower than the height of the other wall on the outer side. At the latch portion of each of the primary members, latch holes with a clearance shape are formed on the one wall, the bottom portion, and the other wall. The latch portion of each of the auxiliary member has: a first convex portion to be inserted into the latch hole formed on the other wall; a second convex portion to be inserted into the latch hole formed on the bottom portion; and a third convex portion to be inserted into the latch hole formed on the one wall. Each of the latch holes has a clearance with a larger dimension than a plate thickness t of the auxiliary member, and has, continuously from the clearance, a clearance with a dimension equal to the plate thickness t of the auxiliary member or smaller than the plate thickness t of the auxiliary member. Therefore, the positioning accuracy between the primary member and the auxiliary member is enhanced, and in addition, since the primary member and the auxiliary member are not easily detached, a latch member such as a rivet is not needed. Further, since the latch portions of the primary member and the auxiliary member can support load by three portions of two walls and a bottom portion, the high stiffness of the angular U-shaped member can be effectively utilized.

The housing according to the present invention is a sheet metal housing formed by sheet metal, in which the insertion frame structure according to the present invention is fixed on the inner side surface of the housing by welding. Therefore, extra members for fixing the insertion frame structure are not needed.

DESCRIPTION OF EMBODIMENTS

Hereinafter, embodiments of the present invention will be described in detail based on the drawings.

Embodiment 1

Figure 1:
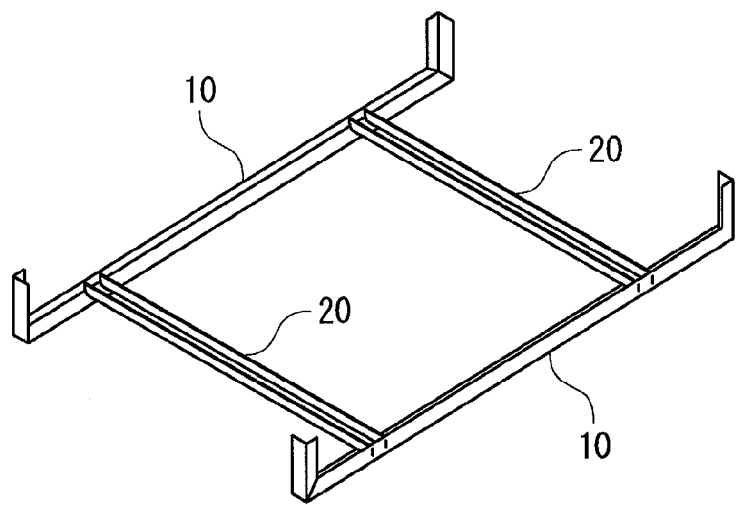
FIG. 1 is a perspective view showing an insertion frame structure according to embodiment 1 of the present invention.
Figure 2:
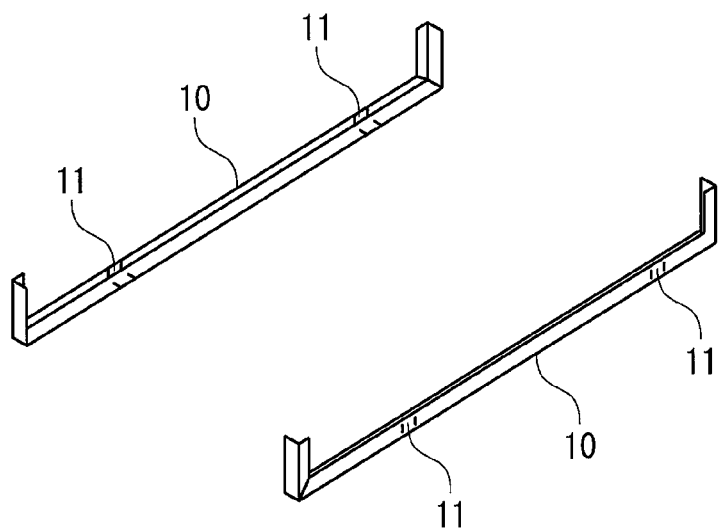
FIG. 2 is a perspective view showing a primary member in the insertion frame structure of embodiment 1.
Figure 2:
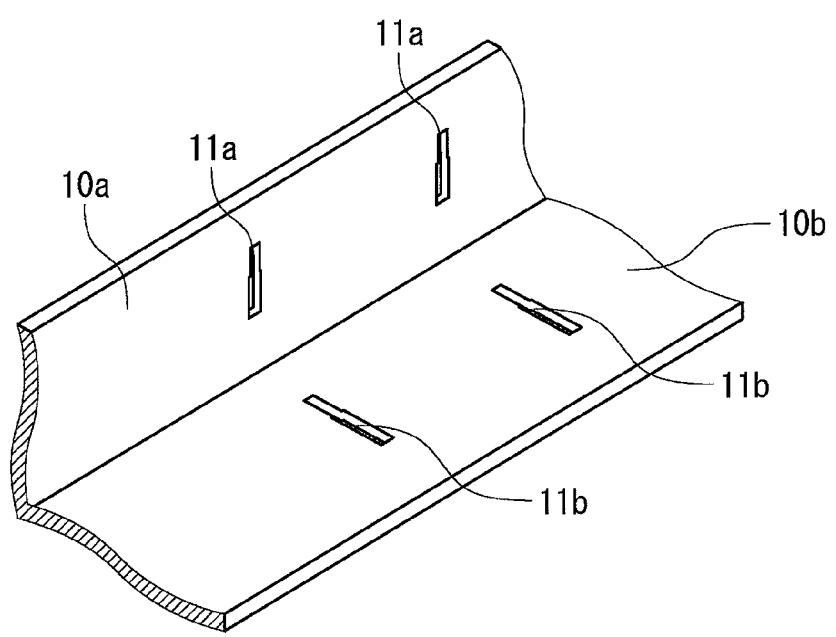
Figure 3:
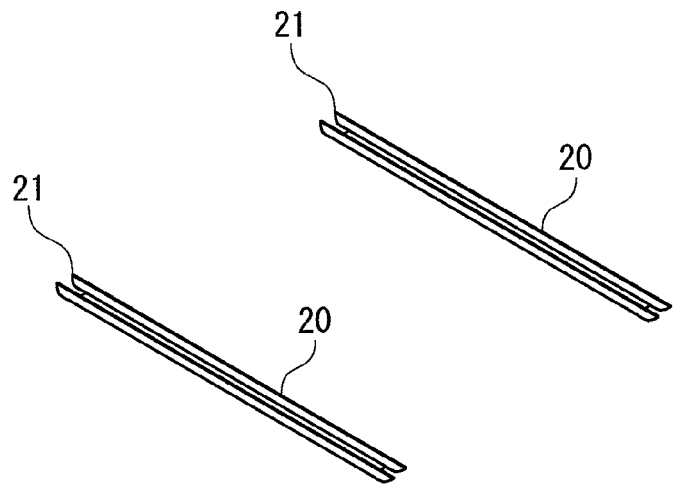
FIG. 3 is a perspective view showing an auxiliary member in the insertion frame structure of embodiment 1.
Figure 3:
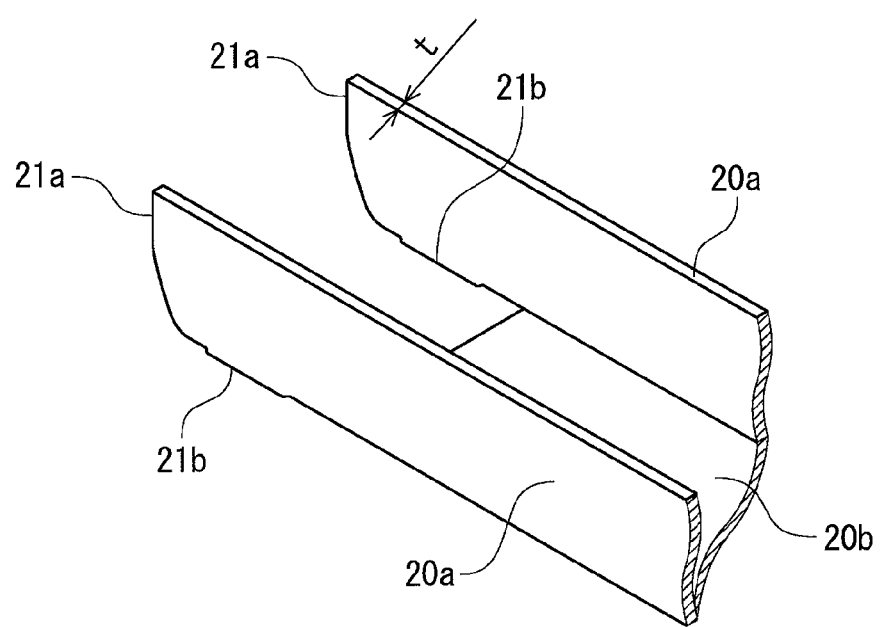
Figure 4:
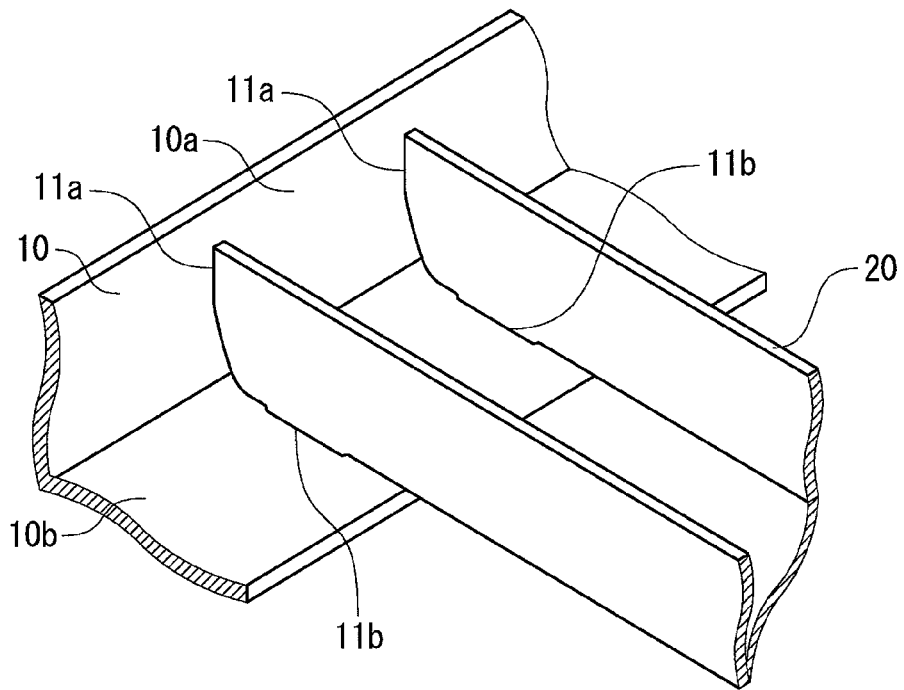
FIG. 4 is a perspective view showing a joint portion in the insertion frame structure of embodiment 1.
Figure 5:
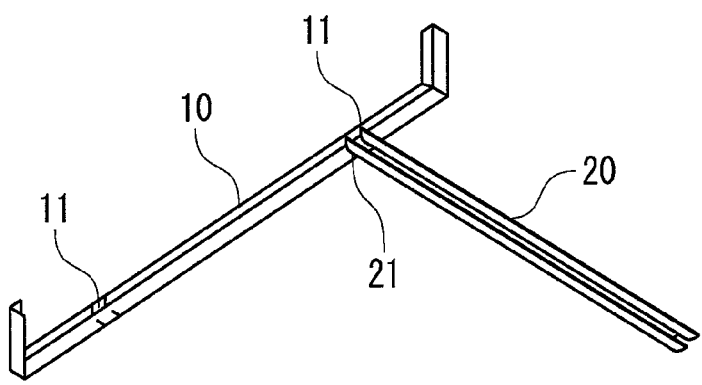
FIG. 5 is a perspective view showing an assembly process of the primary member and the auxiliary member in the insertion frame structure of embodiment 1.
Figure 6:
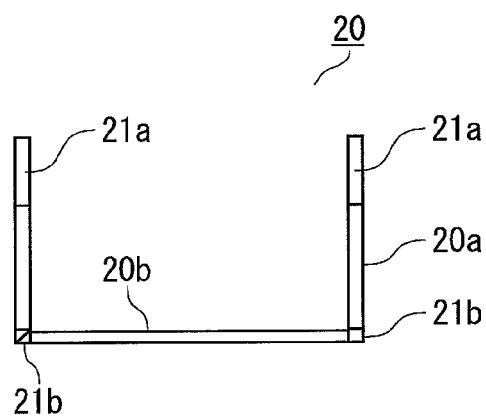
FIG. 6 shows a left side view (a) and a front view (b) of a latch portion of the auxiliary member, and a sectional view (c) showing the way of insertion into a latch hole of the primary member, in the insertion frame structure of embodiment 1.
Figure 6:
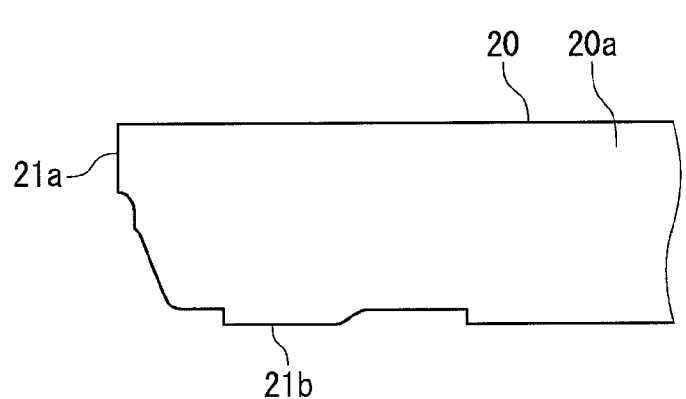
Figure 6:
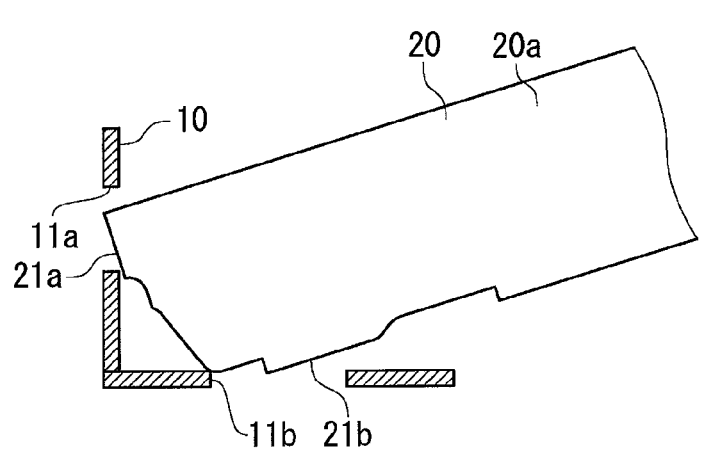
Figure 7:
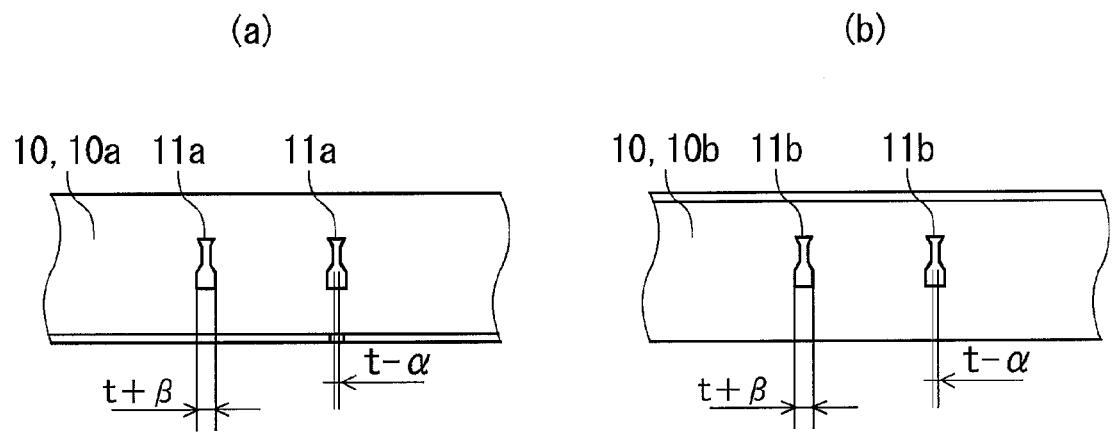
FIG. 7 shows a side view (a) and a plane view (b) of a latch portion of the primary member in the insertion frame structure of embodiment 1.
Figure 16:
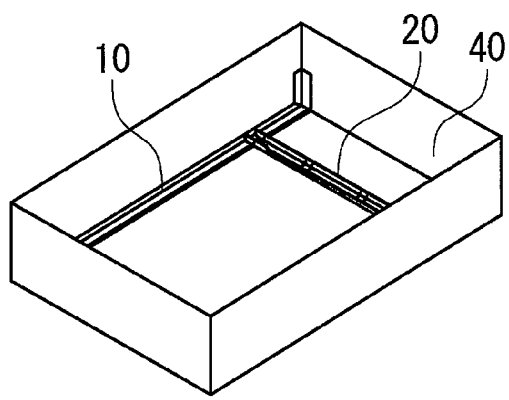
FIG. 16 is a perspective view showing a housing the insertion frame structure according to the present invention.

FIG. 1 is a perspective view showing an insertion frame structure according to embodiment 1 of the present invention. FIG. 2 is a perspective view showing a primary member in the insertion frame structure of embodiment 1. FIG. 3 is a perspective view showing an auxiliary member in the insertion frame structure of embodiment 1. FIG. 4 is a perspective view showing a joint portion in the insertion frame structure of embodiment 1. FIG. 5 is a perspective view showing an assembly process of the primary member and the auxiliary member in the insertion frame structure of embodiment 1. FIG. 6 shows a left side view (a) and a front view (b) of a latch portion of the auxiliary member, and a sectional view (c) showing the way of insertion into a latch hole of the primary member, in the insertion frame structure of embodiment 1. FIG. 7 shows a side view (a) and a plane view (b) of a latch portion of the primary member in the insertion frame structure of embodiment 1. FIG. 16 is a perspective view showing a housing the insertion frame structure according to the present invention.

As shown in FIG. 1, in the insertion frame structure according to the present invention, a pair of primary members 10 having an L-shaped cross-section are placed being separated by a predetermined distance such that the inner surface sides of their L shapes face to each other symmetrically with respect to the center line passing the midpoint of the distance. Then, a plurality of auxiliary members 20 having a plate thickness t and an angular U-shaped cross-section are placed between the primary member 10 and the primary member 10. Then, the end portions of the auxiliary members 20 are joined with the primary members 10 by insertion from the inner surface sides of the L shapes of the primary members 10.

As shown in FIG. 2(a), the primary member 10 has a first latch portion 11 to be joined with the end portion of the auxiliary member 20 by insertion. As shown in FIG. 2(b), a latch hole 11a as a through hole is formed on a wall 10a of the L shape of the first latch portion 11, and a latch hole 11b as a through hole is formed on a bottom portion 10b.

As shown in FIG. 7, the latch holes 11a and 11b in FIG. 2(b) each have a clearance (t+β) sufficiently larger than the plate thickness t of the auxiliary member 20, and have, continuously from this clearance, a clearance smaller than the plate thickness t by a predetermined amount (α).

As shown in FIG. 3(a), the auxiliary member 20 has, at its end portion, a second latch portion 21 to be joined with the first latch portion 11 of the primary member 10. As shown in FIGS. 3(b), 6(a), and 6(b), a convex portion 21a is formed at the end of a wall 20a where a bottom portion 20b is eliminated, and a convex portion 21b is formed at the bottom side of the wall 20a in the vicinity of the end of the wall 20a.

As shown in FIG. 4, the convex portions 21a and 21b of the auxiliary member 20 are respectively fitted into the latch holes 11a and 11b formed on the two surfaces (wall 10a and bottom portion 10b) of the primary member 10.

Upon assembly of the auxiliary member 20 and the primary member 10, first, as shown in FIGS. 5 and 6(c), in the state where the auxiliary member 20 is obliquely inclined, the convex portions 21a and 21b of the auxiliary member 20 are inserted into the clearances (t+β) larger than the plate thickness t, of the latch holes 11a and 11b of the primary member 10. Next, by pressing the auxiliary member 20 from above, the convex portions 21a and 21b of the auxiliary member 20 are pressed into the clearances smaller than the plate thickness t by the predetermined amount (α), of the latch holes 11a and 11b of the primary member 10. Here, if a contact avoiding portion is formed by obliquely cutting a lower portion of the convex portion 21a of the auxiliary member 20, such a situation that the auxiliary member 20 and the primary member 10 cannot be assembled because they contact each other upon assembly, can be avoided.

Thus, the convex portions 21a and 21b of the auxiliary member 20 can be easily inserted into the clearances (t+β) sufficiently larger than the plate thickness t of the auxiliary member 20, and next, by application of the principle of leverage, the convex portions 21a and 21b can be easily pressed and fitted into the clearances smaller than the plate thickness t by the predetermined amount (α).

According to embodiment 1, the latch holes 11a and 11b and the convex portions 21a and 21b are elastically deformed so that they are subjected to compression force from each other. Owing to the compression force, it becomes possible to prevent the convex portions 21a and 21b from easily coming off from the latch holes 11a and 11b when load is applied to the assembled insertion frame structure. Therefore, a rivet as shown in the conventional technique is not needed. In addition, since there is no looseness between the convex portions 21a and 21b and the latch holes 11a and 11b, the positioning accuracy between the primary member 10 and the auxiliary member 20 can be enhanced.

In addition, since the convex portions 21a and 21b do not easily come off from the latch holes 11a and 11b, the assembled insertion frame structure can be moved or carried by hand or the like.

In addition, as shown in FIG. 16, since the assembled insertion frame structure can be directly fixed, by welding, on the inside of a sheet metal housing 40 formed by sheet metal, extra parts for fixing are not needed.

In addition, if the shapes of the members are set such that, when the auxiliary member 20 and the primary member 10 are fitted into each other and assembled, the convex portions 21a and 21b of the auxiliary member 20 do not protrude outward from the latch holes 11a and 11b of the primary member 10, the inner side surface of the sheet metal housing 40 preferably contacts the side surface or the bottom surface of the primary member 10, the bottom surface of the auxiliary member 20, and the like, and therefore the insertion frame structure can be joined with the sheet metal housing 40 by resistance welding such as spot welding or seam welding, or the like. Thus, a sheet metal housing the insertion frame structure according to the present invention can be obtained.

In embodiment 1, the case of using an L-shaped member as the primary member 10 has been described. Instead, the primary member 10 may be an angular U-shaped member having two L shapes. Then, similar latch holes as in the case of using the member having one L shape may be formed on the bottom portion and one of the walls of the two L shapes of the angular U-shaped primary member 10. Then, a pair of the angular U-shaped primary members 10 having such latch holes formed thereon are placed so as to symmetrically face to each other, and the convex portions 21a and 21b of the auxiliary member 20 are fitted into the latch holes, thereby obtaining a similar insertion frame structure as in the case of using the L-shaped member.

In embodiment 1, the case where the cross-section of the auxiliary member 20 has an angular U shape, has been described. However, the present invention is not limited thereto. For example, sheet metal or shape steel having an L shape may be used.

Embodiment 2

Figure 8:
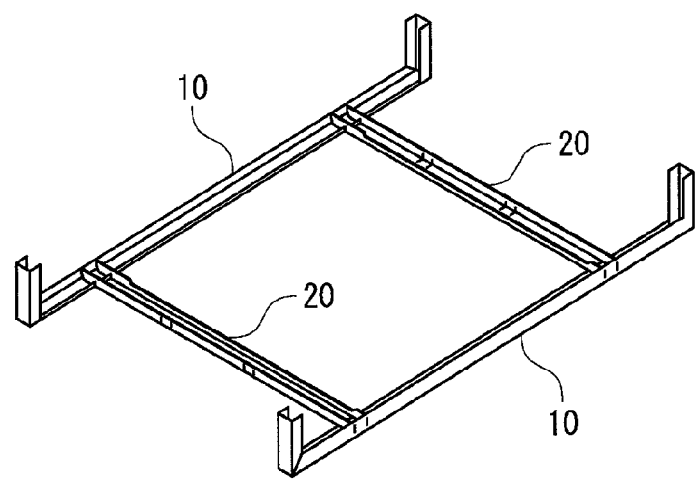
FIG. 8 is a perspective view showing an insertion frame structure according to embodiment 2 of the present invention.
Figure 9:
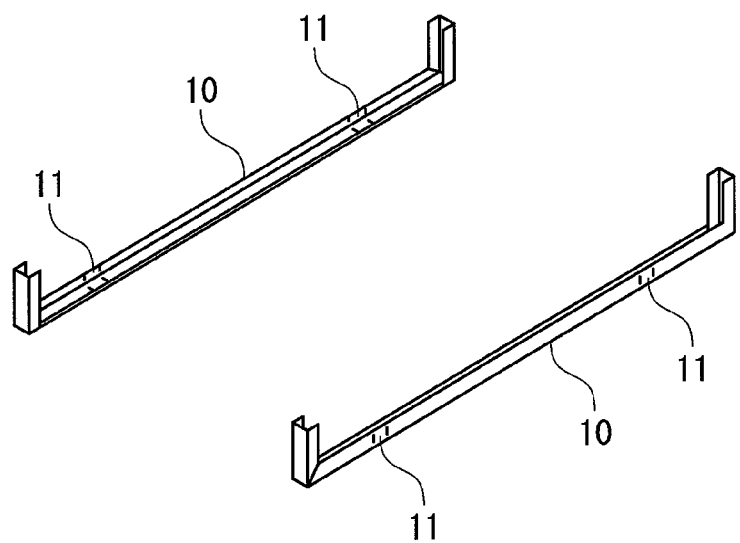
FIG. 9 is a perspective view showing a primary member in the insertion frame structure of embodiment 2.
Figure 9:
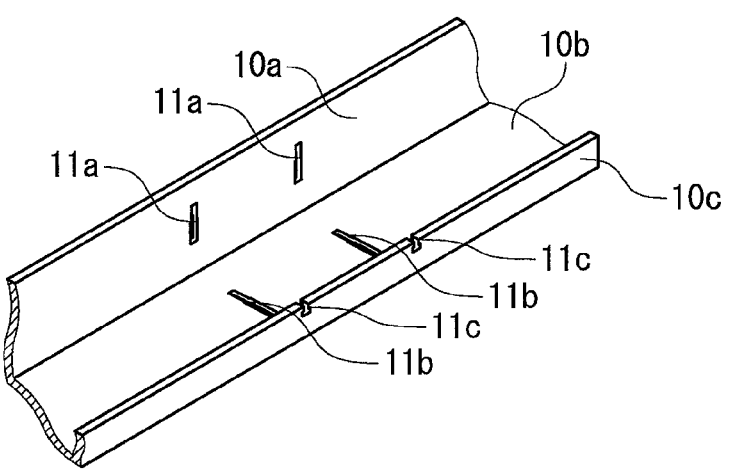
Figure 10:
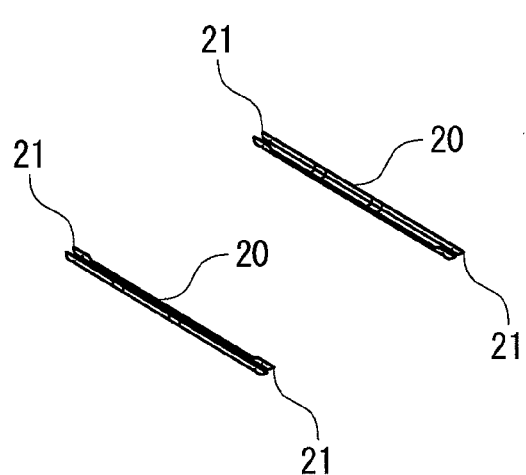
FIG. 10 is a perspective view showing an auxiliary member in the insertion frame structure of embodiment 2.
Figure 10:
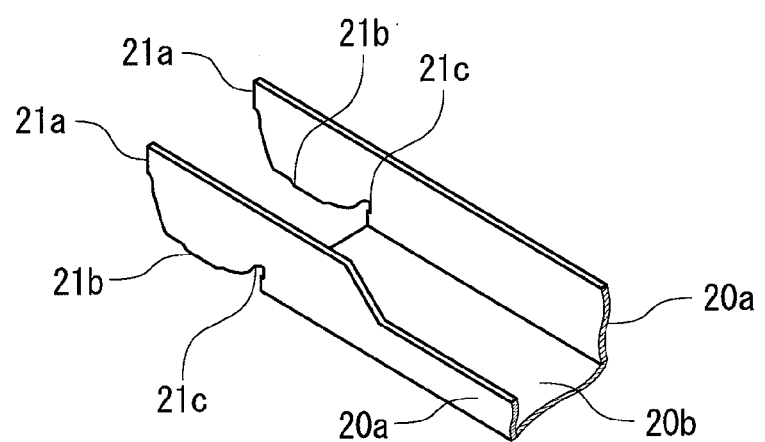
Figure 11:
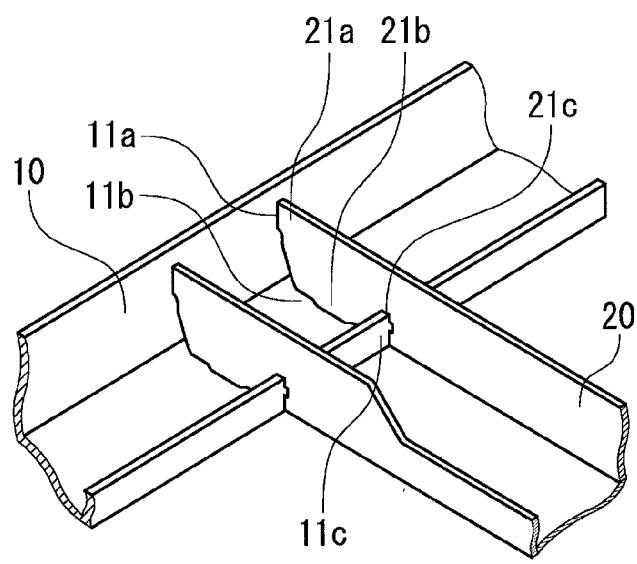
FIG. 11 is a perspective view showing a joint portion in the insertion frame structure of embodiment 2.
Figure 12:
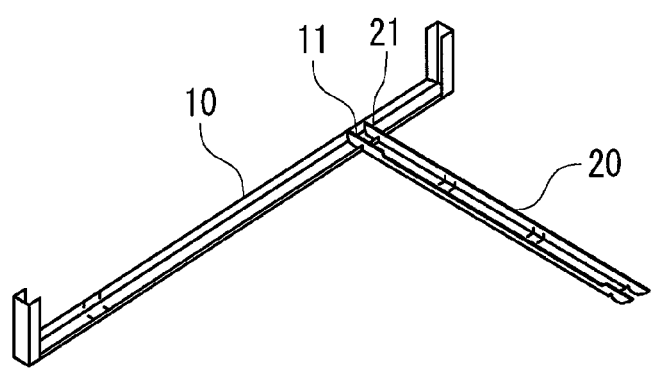
FIG. 12 is a perspective view showing an assembly process of the primary member and the auxiliary member in the insertion frame structure of embodiment 2.
Figure 13:
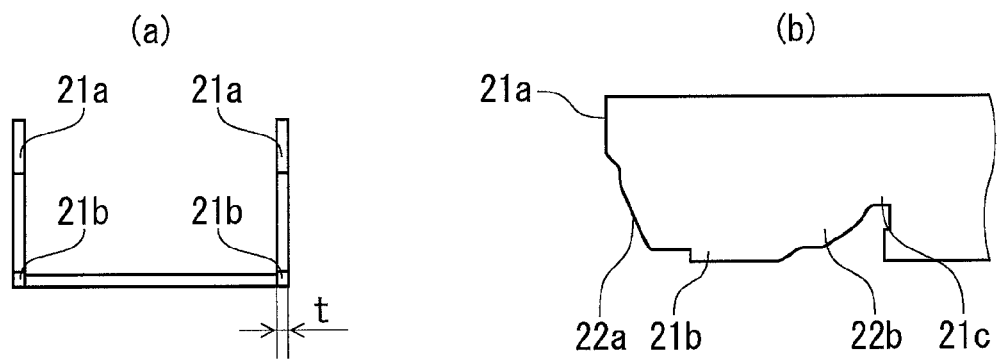
FIG. 13 shows a left side view (a) and a front view (b) of a latch portion of the auxiliary member in the insertion frame structure of embodiment 2.
Figure 14:
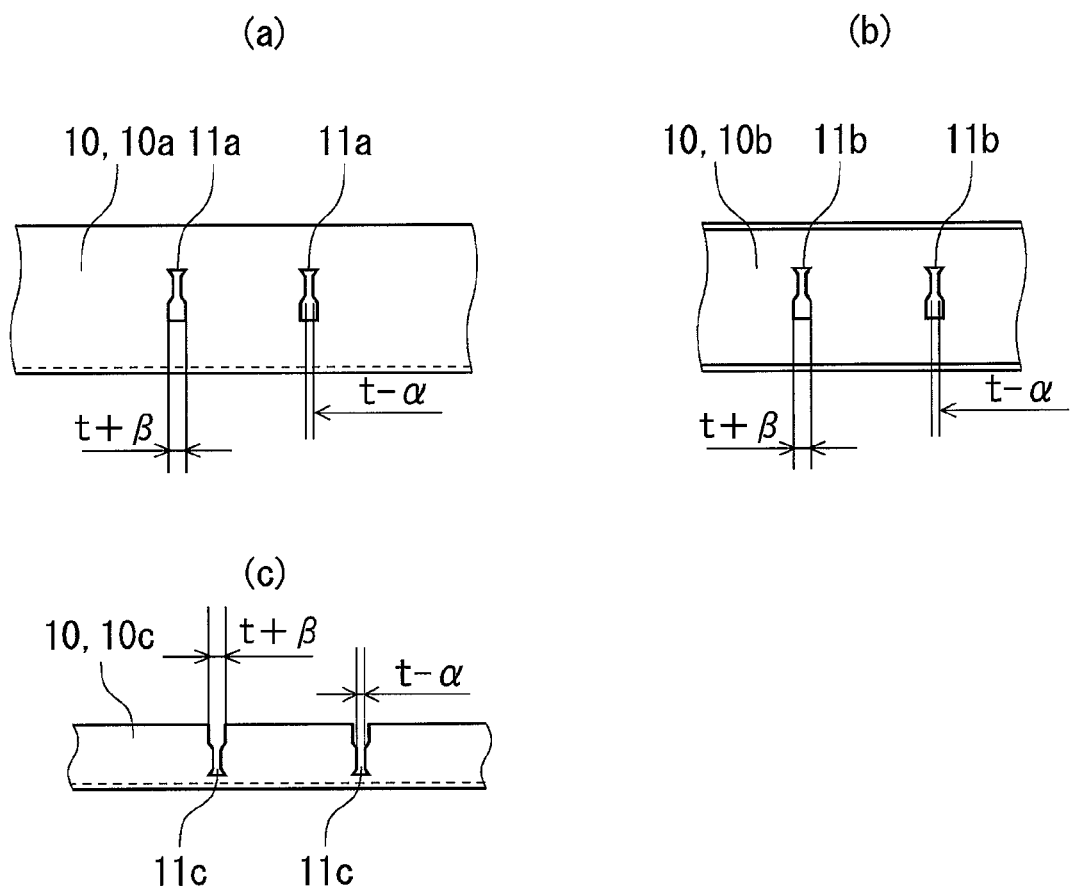
FIG. 14 shows a left side view (a), a plane view (b), and a right side view (c) of a latch portion of the primary member in the insertion frame structure of embodiment 2.
Figure 15:
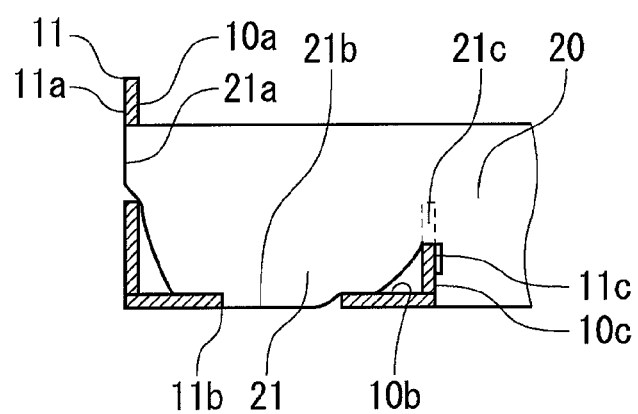
FIG. 15 is a sectional view of the latch portions of the primary member and the auxiliary member in the insertion frame structure of embodiment 2.

FIG. 8 is a perspective view showing an insertion frame structure according to embodiment 2 of the present invention. FIG. 9 is a perspective view showing a primary member in the insertion frame structure of embodiment 2. FIG. 10 is a perspective view showing an auxiliary member in the insertion frame structure of embodiment 2. FIG. 11 is a perspective view showing a joint portion in the insertion frame structure of embodiment 2. FIG. 12 is a perspective view showing an assembly process of the primary member and the auxiliary member in the insertion frame structure of embodiment 2. FIG. 13 shows a left side view (a) and a front view (b) of a latch portion of the auxiliary member in the insertion frame structure of embodiment 2. FIG. 14 shows a left side view (a), a plane view (b), and a right side view (c) of a latch portion of the primary member in the insertion frame structure of embodiment 2. FIG. 15 is a sectional view of the latch portions of the primary member and the auxiliary member in the insertion frame structure of embodiment 2.

As shown in FIG. 8, in the insertion frame structure according to embodiment 2, a pair of primary members 10 having an angular U-shaped cross-section are placed being separated by a predetermined distance and facing to each other symmetrically with respect to the center line passing the midpoint of the distance. Then, a plurality of auxiliary members 20 having an angular U-shaped cross-section are placed between the primary member 10 and the primary member 10. Then, the end portions of the auxiliary members 20 are joined with the primary members 10 by insertion from the inner surface sides of the angular U shapes of the primary members 10.

The pair of primary members 10 having an angular U shape, that is, a groove shape are placed such that the groove faces upward, and the end portion of the auxiliary member 20 is joined with three surfaces of the primary member 10 by insertion.

As shown in FIG. 9(a), the primary member 10 has a first latch portion 11 to be joined with the end portions of the auxiliary member 20. As shown in FIG. 9(b), at the first latch portion 11, one of the walls rising from the bottom portion 10b of the primary member 10, which is closer to the center line side, that is, the inner side wall 10c is formed to be lower than the other wall 10a on the outer side. As shown in FIGS. 9(b) and 14, at the first latch portion 11 shown in FIG. 9(a), a latch hole 11a is formed on the outer side wall 10a, a latch hole 11b is formed on the bottom portion 10b, and a latch hole 11c is formed on the inner side wall 10c. The latch hole 11a, the latch hole 11b, and the latch hole 11c each have a clearance (t+β) sufficiently larger than a plate thickness t of the auxiliary member 20, and have, continuously from this clearance, a clearance smaller than the plate thickness t by a predetermined amount (α).

As shown in FIG. 10(a), the auxiliary member 20 has, at its end portion, a second latch portion 21 to be joined with the first latch portion 11 of the primary member 10. As shown in FIG. 10(b), a first convex portion 21a is formed at the end of a wall 20a of the auxiliary member 20, and a second convex portion 21b and a third convex portion 21c are formed at the bottom side of the wall 20a in the vicinity of the end of the wall 20a.

As shown in FIG. 11, the first convex portion 21a, the second convex portion 21b, and the third convex portion 21c of the auxiliary member 20 are respectively fitted into the latch holes 11a, 11b, and 11c formed on the three surfaces (outer side wall 10a, bottom portion 10b, and inner side wall 10c) of the primary member 10.

Upon assembly of the auxiliary member 20 and the primary member 10, first, as shown in FIG. 12, in the state where the auxiliary member 20 is obliquely inclined relative to the primary member 10, the convex portions 21a, 21b, and 21c of the auxiliary member 20 are respectively inserted into the clearances (t+β) larger than the plate thickness t of the auxiliary member 20, of the latch holes 11a, 11b, and 11c of the primary member 10. Next, by pressing the auxiliary member 20 from above, the convex portions 21a, 21b, and 21c of the auxiliary member 20 are pressed into the clearances smaller than the plate thickness t by the predetermined amount (α), of the latch holes 11a, 11b, and 11c of the primary member 10. Here, as shown in FIG. 13, if contact avoiding portions 22a and 22b are formed by obliquely cutting a lower portion of the convex portion 21a and a front portion of the concave portion 21c of the auxiliary member 20, such a situation that the auxiliary member 20 and the primary member 10 cannot be assembled because they contact each other upon assembly, can be avoided.

In addition, the positions and dimensions of the latch holes 11a, 11b, and 11c at the first latch portion 11 of the primary member 10, or the positions and dimensions of the convex portions 21a, 21b, and 21c at the second latch portion 21 of the auxiliary member 20, are determined so that the convex portions 21a, 21b, and 21c of the auxiliary member 20 will respectively contact the end surfaces of the latch holes 11a, 11b, and 11c of the primary member 10.

In addition, as shown in FIG. 15, the latch holes 11a, 11b, and 11c are each formed by the clearance (t+β) sufficiently larger than the plate thickness t of the auxiliary member 20, and the clearance smaller than the plate thickness t by the predetermined amount (α) which is continuous from the clearance (t+β). Therefore, after the convex portions 21a, 21b, and 21c are inserted into the clearance (t+β) larger than the plate thickness t, by pressing the auxiliary member 20 from above, the convex portions 21a, 21b, and 21c can be easily pressed into the clearance smaller than the plate thickness t by the predetermined amount (α).

According to embodiment 2, the latch holes 11a, 11b, and 11c and the convex portions 21a, 21b, and 21c are elastically deformed so that they are subjected to compression force from each other. Owing to the compression force, it becomes possible to prevent the convex portions 21a, 21b, and 21c from easily coming off from the latch holes 11a, 11b, and 11c when load is applied to the assembled insertion frame structure. In addition, the positioning accuracy between the primary member 10 and the auxiliary member 20 can be enhanced.

In addition, since the convex portions 21a, 21b, and 21c do not easily come off from the latch holes 11a, 11b, and 11c, the assembled insertion frame structure can be moved or carried by hand or the like.

In addition, the convex portions 21a, 21b, and 21c of the auxiliary member 20 respectively contact the end surfaces of the latch holes 11a, 11b and 11c of the primary member 10. Therefore, when a heavy load is mounted on the auxiliary member 20, the load can be supported by three surfaces (the surfaces of the outer side wall 10a, the bottom portion 10b, and the inner side wall 10c) of the angular U shape of the primary member 10, and therefore the high stiffness of the angular U-shaped member can be effectively utilized.

In addition, if the shapes of the members are set such that, when the auxiliary member 20 and the primary member 10 are fitted into each other and assembled, the convex portions 21a, 21b, and 21c of the auxiliary member 20 do not protrude outward from the latch holes 11a, 11b and 11c of the primary member 10, as shown in FIG. 16, the inner side surface of the sheet metal housing 40 preferably contacts the side surface and the bottom surface of the primary member 10, the bottom surface of the auxiliary member 20, and the like, and therefore the assembled insertion frame structure can be joined with the sheet metal housing 40 by resistance welding such as spot welding or seam welding, or the like. Thus, a sheet metal housing the insertion frame structure according to the present invention can be obtained.

In embodiment 2, the case where the cross-section of the auxiliary member 20 has an angular U shape, has been described. However, the present invention is not limited thereto. For example, sheet metal or shape steel having an L shape may be used.

Embodiment 3

In the above embodiments 1 and 2, the latch holes 11a, 11b, and 11c of the first latch portion 11 of the primary member 10 each have a clearance (t+β) larger than the plate thickness t of the auxiliary member 20, and have, continuously from this clearance, a clearance smaller than the plate thickness t of the auxiliary member 20. On the other hand, in embodiment 3, the latch holes 11a, 11b, and 11c of the first latch portion 11 of the primary member 10 each have a clearance (t+β) larger than the plate thickness t of the auxiliary member 20, and have, continuously from this clearance, a clearance equal to the plate thickness t of the auxiliary member 20.

Since the clearances of the latch holes 11a, 11b, and 11c of the first latch portion 11 of the primary member 10 are equal to the plate thickness t of the auxiliary member 20, the convex portions 21a, 21b, and 21c of the auxiliary member 20 can be easily pressed into the latch holes 11a, 11b, and 11c of the primary member 10 with smaller force than in embodiments 1 and 2, and in addition, the members can be easily disassembled and then adjustment or the like can be easily performed.

In addition, since the hole clearances of the latch holes 11a, 11b, and 11c of the first latch portion 11 of the primary member 10 are equal to the plate thickness t of the auxiliary member 20, the auxiliary member 20 can be prevented from easily coming off from the primary member 10 when load is applied, so that a rivet as shown in the conventional technique is not needed. In addition, the positioning accuracy between the primary member 10 and the auxiliary member 20 can be enhanced.

Embodiment 4

Figure 17:
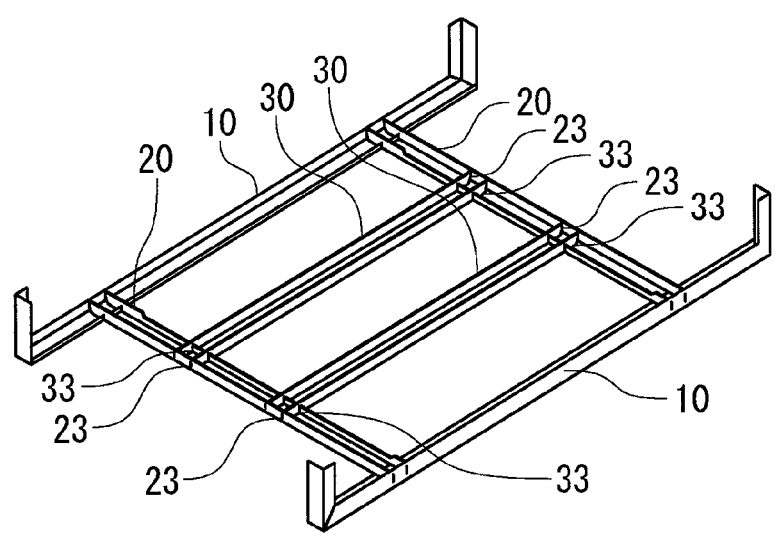
FIG. 17 is a perspective view showing an insertion frame structure according to embodiment 4 of the present invention.

FIG. 17 is a perspective view showing an insertion frame structure according to embodiment 4 of the present invention.

In embodiment 4, in the insertion frame structure composed of the primary member 10 and the auxiliary member 20 shown in embodiments 1 to 3, a plurality of second auxiliary members 30 joined with the auxiliary member 20 by insertion are provided. The auxiliary member 20 has a third latch portion 23, and the second auxiliary member 30 has a fourth latch portion 33.

At the third latch portion 23 of the auxiliary member 20, as in the above embodiments 1 to 3, a latch hole is formed which has a clearance with a larger dimension than the plate thickness of the second auxiliary member 30, and has, continuously from this clearance, a clearance with a dimension equal to the plate thickness of the second auxiliary member 30 or smaller than the plate thickness of the second auxiliary member 30. At the fourth latch portion 33 of the second auxiliary member 30, as in the above embodiments 1 to 3, a convex portion to be fitted into the latch hole formed on the auxiliary member 20, is formed.

According to embodiment 4, the insertion frame structure further reinforced by the second auxiliary member 30 is obtained.

In addition, as shown in FIG. 16, since the assembled insertion frame structure can be directly fixed, by welding, on the inside of a sheet metal housing 40 formed by sheet metal, extra parts for fixing are not needed.

It is noted that, within the scope of the present invention, the above embodiments may be freely combined with each other, or each of the above embodiments may be modified or abbreviated as appropriate.

The invention claimed is:

1. An insertion frame structure comprising:
  a pair of primary members whose cross-sectional shapes possess an L shaped portion, each of the primary members comprising a bottom surface side and an inner surface side extending from the bottom surface side to form the L-shaped portion, and the pair of primary members being separated by a predetermined distance such that the inner surface sides of the each of the primary members face each other symmetrically with respect to a center line passing the midpoint of the predetermined distance; and
  a plurality of auxiliary members whose cross-sectional shapes are groove-shaped so that each of the auxiliary members comprises a bottom portion, a first side portion extending from the bottom portion, and a second side portion extending from the bottom portion to form the groove-shape with an open top portion, and each of the auxiliary members being placed between the primary members, wherein
  the primary members and the auxiliary members are joined with each other at latch portions,
  the latch portions of the primary members each have a latch hole,
  the latch portions of the auxiliary members each have a convex portion to be inserted into the latch hole, and
  each of the latch holes has a first clearance area and a second clearance area extending continuously from the first clearance area, the first clearance area being larger than a plate thickness of each of the auxiliary members, and the second clearance area being equal to or smaller than the plate thickness of each of the auxiliary members.

2. The insertion frame structure according to claim 1, wherein a contact avoiding portion is formed by obliquely cutting a lower portion of the convex portion so that the auxiliary member will not contact the primary member at the contact avoiding portion upon insertion of the convex portion into the latch hole.

3. The insertion frame structure according to claim 1, wherein the convex portions are formed so as not to protrude outward from the latch holes.

4. The insertion frame structure according to claim 1, wherein the plurality of auxiliary members comprises a first auxiliary member and a second auxiliary member, the insertion frame structure further comprising:
  a third auxiliary member having an L shaped portion, the third auxiliary member being placed between the first and second auxiliary members, wherein
  the first and second auxiliary members each have a second latch hole comprising a third clearance area and a fourth clearance area extending continuously from the third clearance area, the third clearance area being larger than a plate thickness of the second auxiliary member and the fourth clearance area being equal to or smaller than the plate thickness of the second auxiliary member, and
  the second auxiliary member has a convex portion to be fitted into the second latch hole.

5. The insertion frame structure according to claim 1, wherein the latch holes are in both the bottom surface and the inner side surface of each of the primary members.

6. The insertion frame structure according to claim 1, wherein an entirety of the cross-sectional shape of each of the primary members is L-shaped.

7. A housing which is a sheet metal housing formed by sheet metal, an insertion frame structure being fixed on an inner side surface of the housing by welding, wherein
the insertion frame structure includes:
a pair of primary members whose cross-sectional shapes possess an L shaped portion, each of the primary members comprising a bottom surface side and an inner surface side extending from the bottom surface side to form the L-shape portion, and the pair of primary members being separated by a predetermined distance such that the inner surface sides of the each of the primary members face each other symmetrically with respect to a center line passing the midpoint of the predetermined distance; and
a plurality of auxiliary members whose cross-sectional shapes are groove-shaped so that each of the auxiliary members comprises a bottom portion, a first side portion extending from the bottom portion, and a second side portion extending from the bottom portion to form the groove-shape with an open top portion, and each of the auxiliary members being placed between the primary members, and wherein
the primary members and the auxiliary members are joined with each other at latch portions,
the latch portions of the primary members each have a latch hole,
the latch portions of the auxiliary members each have a convex portion to be inserted into the latch hole, and
each of the latch holes has a first clearance area and a second clearance area extending continuously from the first clearance area, the first clearance area being larger than a plate thickness of each of the auxiliary members, and the second clearance area being equal to or smaller than the plate thickness of each of the auxiliary members, wherein
each of the auxiliary members is groove-shaped so that each of the auxiliary members comprises a bottom portion, a first side portion extending from the bottom portion, and a second side portion extending from the bottom portion to form the groove-shape with an open top portion.

8. The housing according to claim 7, wherein the latch holes are in both the bottom surface and the inner side surface of each of the primary members.

9. The housing according to claim 7, wherein an entirety of the cross-sectional shape of each of the primary members is L-shaped.

10. A housing which is a sheet metal housing formed by sheet metal, an insertion frame structure being fixed on the inner side surface of the housing by welding, wherein
the insertion frame structure includes:
a pair of groove-shaped primary members, each of the groove-shaped primary members comprising a bottom portion, a first side portion extending from the bottom portion, and a second side portion extending from the bottom portion to form the groove-shape with an open top portion, the pair of primary members being separated by a predetermined distance and facing each other symmetrically with respect to a center line passing the midpoint of the predetermined distance, and the first side portion of each of the groove-shaped primary members being closer to the center line than the second side portion of each of the groove-shaped members; and
a plurality of auxiliary members whose cross-sectional shapes possess an L shaped portion, and which are placed between the primary members, wherein
the primary members and the auxiliary members are joined with each other at latch portions, the latch portions including primary member latch portions and auxiliary member latch portions,
the primary members are placed with the bottom portion of the groove shape facing downward,
at the primary member latch portion of each of the primary members, the height of the first side portion is lower than the height of the second side portion,
at the primary member latch portion of each of the primary members, latch holes are formed on the bottom portion, the first side portion, and the second side portion,
the auxiliary member latch portion of each of the auxiliary member has: a first convex portion to be inserted into the latch hole formed on the second side portion; a second convex portion to be inserted into the latch hole formed on the bottom portion; and a third convex portion to be inserted into the latch hole formed on the first side portion, and
each of the latch holes formed in the bottom portion, the first side portion, and the second side portion of each of the primary members includes a first clearance area and a second clearance area extending continuously from the first clearance area, the first clearance area being larger than a plate thickness of each of the auxiliary members, and the second clearance area being equal to or smaller than the plate thickness of each of the auxiliary members.

11. An insertion frame structure comprising:
a pair of groove-shaped primary members, each of the groove-shaped primary members comprising a bottom portion, a first side portion extending from the bottom portion, and a second side portion extending from the bottom portion to form the groove-shape with an open top portion, the pair of primary members being separated by a predetermined distance and facing each other symmetrically with respect to a center line passing the midpoint of the predetermined distance, and the first side portion of each of the groove-shaped primary members being closer to the center line than the second side portion of each of the groove-shaped members; and
a plurality of auxiliary members whose cross-sectional shapes possess an L shaped portion, and which are placed between the primary members, wherein
the primary members and the auxiliary members are joined with each other at latch portions, the latch portions including primary member latch portions and auxiliary member latch portions,
the primary members are placed with the bottom portion of the groove shape facing downward,
at the primary member latch portion of each of the primary members, the height of the first side portion is lower than the height of the second side portion,
at the primary member latch portion of each of the primary members, latch holes are formed on the bottom portion, the first side portion, and the second side portion,
the auxiliary member latch portion of each of the auxiliary member has: a first convex portion to be inserted into the latch hole formed on the second side portion; a second convex portion to be inserted into the latch hole formed on the bottom portion; and a third convex portion to be inserted into the latch hole formed on the first side portion, and each of the latch holes formed in the bottom portion, the first side portion, and the second side portion of each of the primary members includes a first clearance area and a second clearance area extending continuously from the first clearance area, the first clearance area being larger than a plate thickness of each of the auxiliary members, and the second clearance area being equal to or smaller than the plate thickness of each of the auxiliary members.

12. The insertion frame structure according to claim 11, wherein contact avoiding portions are formed by obliquely cutting a lower portion of the first convex portion and the second convex portion side of the third convex portion so that the auxiliary member will not contact the primary member at the contact avoiding portions upon insertion of the first convex portion, the second convex portion, and the third convex portion into the respective latch holes.

13. The insertion frame structure according to claim 11, wherein the convex portions are formed so as not to protrude outward from the latch holes.

14. The insertion frame structure according to claim 11, wherein the plurality of auxiliary members comprises a first auxiliary member and a second auxiliary member, the insertion frame structure further comprising:

a third auxiliary member having an L shaped portion, the third auxiliary member being placed between the first and second auxiliary members, wherein the first and second auxiliary members each have a second latch hole comprising a third clearance area and a fourth clearance area extending continuously from the third clearance area, the third clearance area being larger than a plate thickness of the second auxiliary member and the fourth clearance area being equal to or smaller than the plate thickness of the second auxiliary member, and the second auxiliary member has a convex portion to be fitted into the second latch hole.

* * * * *